(12) United States Patent
Tian

(10) Patent No.: US 11,159,330 B1
(45) Date of Patent: Oct. 26, 2021

(54) RENDERING ONLINE CONTENT VIA SECURED URL

(71) Applicant: WhatsApp Inc., Menlo Park, CA (US)

(72) Inventor: Cheng Tian, San Ramon, CA (US)

(73) Assignee: WHATSAPP LLC., Menlo Park, CA (US)

(*) Notice: Subject to any disclaimer, the term of this patent is extended or adjusted under 35 U.S.C. 154(b) by 20 days.

(21) Appl. No.: 16/662,264

(22) Filed: Oct. 24, 2019

(51) Int. Cl.
| H04L 9/32 | (2006.01) |
| H04L 12/58 | (2006.01) |
| H04L 29/08 | (2006.01) |
| G06F 3/0481 | (2013.01) |
| G06F 3/0484 | (2013.01) |

(52) U.S. Cl.
CPC .......... *H04L 9/3247* (2013.01); *G06F 3/0481* (2013.01); *G06F 3/0484* (2013.01); *H04L 51/32* (2013.01); *H04L 67/02* (2013.01); *H04L 67/20* (2013.01); *H04L 9/3252* (2013.01)

(58) Field of Classification Search
CPC ..... H04L 9/3247; H04L 9/3252; H04L 51/32; H04L 67/02; H04L 67/20; G06F 3/0481; G06F 3/0484
See application file for complete search history.

(56) References Cited

U.S. PATENT DOCUMENTS

| 7,921,292 B1* | 4/2011 | Pauker | H04L 9/321 713/171 |
| 9,819,648 B1* | 11/2017 | Chilakapati | H04L 63/08 |
| 10,176,418 B1* | 1/2019 | Osborn | G06K 19/071 |
| 2017/0214973 A1* | 7/2017 | Slaughter | H04N 21/4316 |
| 2020/0279270 A1* | 9/2020 | Lieberman | G06K 9/00926 |

OTHER PUBLICATIONS

Hoang-Giang Do et al., Privacy-Preserving Social Network for an Untrusted Server, Sep. 1, 2013, IEEE Computer Society, pp. 472-478 (Year: 2013).*
Kemal Bicakci et al., TwinCloud: Secure Cloud Sharing Without Explicit Key Management, Oct. 1, 2017, IEEE Workshop on Security and Privacy in the Cloud, pp. 1-5 (Year: 2017).*

* cited by examiner

*Primary Examiner* — Tam T Tran
(74) *Attorney, Agent, or Firm* — Kacvinsky Daisak Bluni PLLC

(57) ABSTRACT

Exemplary embodiments are directed to a method for allowing a user at a first client device to provide access to restricted content on a content provider server to a user at a second client device without providing identifying information of the second client device or the user to the content provider. The second client device receives, in a messaging app, a message from the first client device comprising a link to a content item at a content provider and an identifier of a private/public key pair on the second client device. Second client device displays the link in the user interface of the messaging app and receives a user selection of the link. Second client device generates generating a digital signature for the link using the private key of the private/public key pair and sends the link and the digital signature to the content provider. The content item is then received from the content provider and displayed on the second client device.

20 Claims, 14 Drawing Sheets

RENDERING ONLINE CONTENT VIA SECURED URL

BACKGROUND

A first user on a client device may wish to provide access to paid-for or otherwise restricted content from a third-party content provider to a second user at a second client device. Access to the content may be available via a link. Currently, to allow access to the content only to the second user, the user must submit the second user's identity information to the third-party content provider, typically by entering the second user's identity information into an app on the first user's client device specific to the third party or to a website of the third party using a standard web browser. This process can be cumbersome and is invasive to the privacy of the second user. Additionally, this process does not work if the first user wishes to provide access to the content to a group of other users.

SUMMARY

Exemplary embodiments are directed to a method for allowing users to restrict access to content provided by a third-party content provider and accessible via a URL on the website of the third-party. Such content could include, for example, a gift card or content that may require payment before the content may be accessed. Such content may also include private files of the user hosted on a cloud storage server. A sending user wishes to send the URL to a receiving user via a messaging app and wishes to restrict access only to the receiving user. The first user selects the content and elects to share the content with the receiving user. The third-party generates a link to the content and sends the link to the messaging app on the sending user's client device. The messaging app provides a public key of the receiving user to the third-party content provider, which may only be used for one link. The third-party content provider stores the public key of the receiving user in a database and associates it with the generated URL. The URL is then sent to the receiving user by the first user via the messaging app. The receiving user generates a signature for the URL using a private key corresponding to the public key provided to the third-party content provider. When the link is selected by the receiving user, the signature is appended as an argument to the URL and sent to the third-party. The third-party verifies the signature using the receiving user's public key, and grants access to the content.

BRIEF DESCRIPTION OF THE DRAWINGS

Certain illustrative aspects are described in connection with the annexed drawings. These aspects are indicative of the various ways in which the principles disclosed can be practiced and all aspects and equivalents thereof are intended to be within the scope of the claimed subject matter. Other advantages and novel features will be apparent from the following detailed description when considered in conjunction with the drawings.

DETAILED DESCRIPTION

Figure 1:
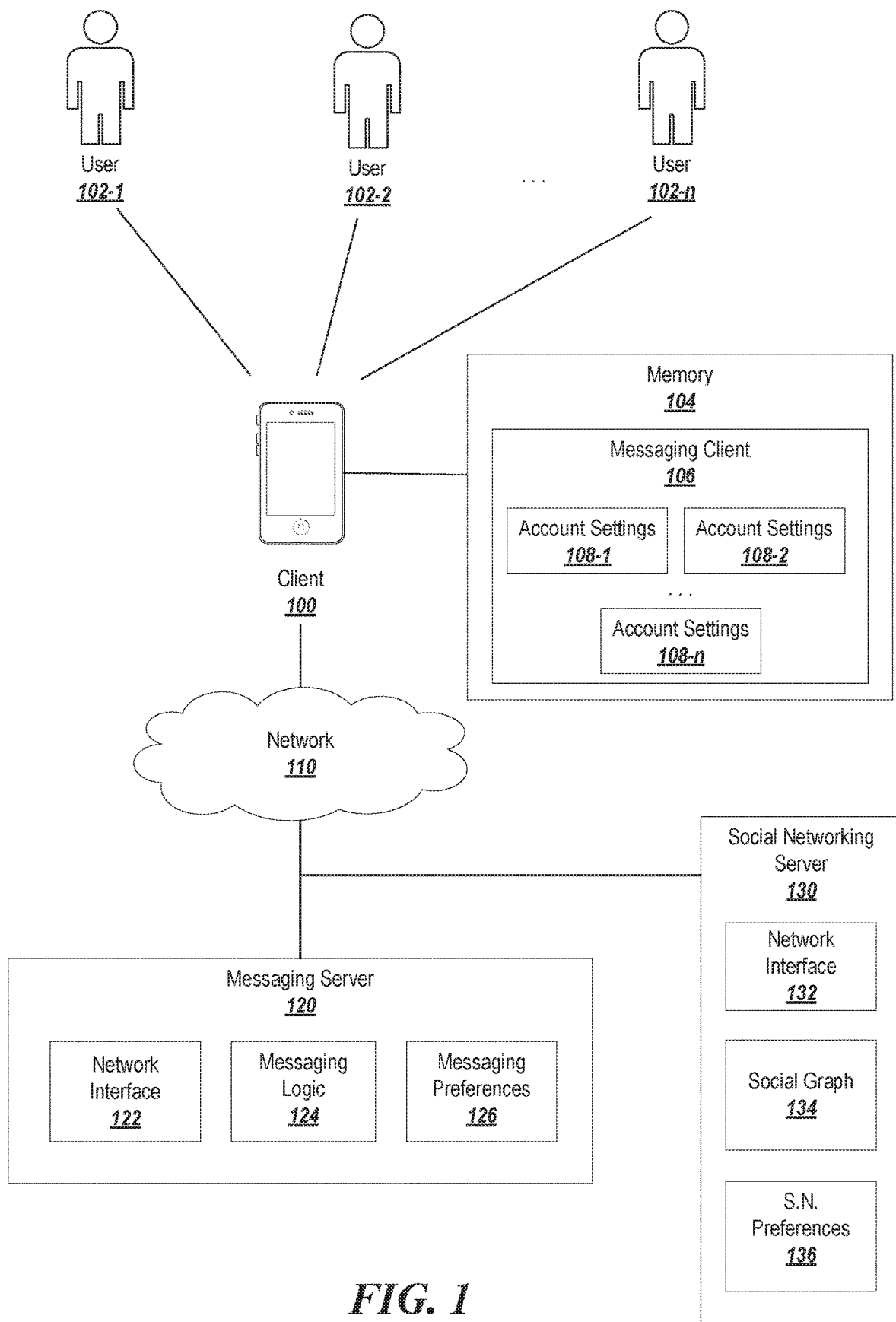
FIG. 1 depicts an exemplary system for connecting a client to a messaging service and/or a social networking service.

Exemplary embodiments described herein pertain to improvements in content delivery, and, in particular, to techniques for the restricted distribution of content via secured URLs.

Users of a messaging system may exchange messages via a messaging app installed on mobile client devices. Such messages may include, for example, SMS messages, email messages or other types of electronic messages. Users of the messaging apps may become familiar with and comfortable with the use of the messaging apps for communication with friends, associates and acquaintances. Users may be associated with friends, associates and acquaintances via connections in a social networking graph on a social networking site. The messaging app used to communicate with friends, associates and acquaintances may be part of or may be associated with the social networking site.

Users may access content by provided by third-party content providers. Such content may include, for example, gift cards, videos, photographs, audio files, digital books or any other type of digital media or content which may be distributed electronically. Such content may also include, for example, files which may be owned by a user but stored on third-party cloud storage. Content may be accessed, for example, via app installed on the user's client device specific to the third-party content provider, or via a generic browser installed on the client device to access the content through a webpage hosted by the third-party content provider. Alternatively, third-party content may also be accessed via a messaging bot from within the messaging app.

Third-party content providers may wish to charge fees for content downloaded by users or may otherwise wish to restrict the distribution of content to specific users. Users may wish to purchase or otherwise procure access to such content on behalf of other users. For example, one user may wish to purchase a gift card from a third-party online merchant (i.e. the third-party content provider) for delivery to a second user or may wish to provide access to a private file of the user stored on a cloud storage service.

When purchasing or otherwise procuring access to content for a receiving user, a sending user must typically supply identifying information of the receiving user to the third-party content provider, such that the third-party content provider can verify the identity of the receiving user when the receiving user requests delivery of the content. This process may be cumbersome and, more importantly, may be invasive to the privacy of the receiving user. Further, the sending user may not have access to all information required by the third-party content provider. It may therefore be desirable to be able to have a method for identifying the receiving user to the content provider without the sending user having to provide the identifying information of the receiving user.

Additionally, a receiving user must be notified of the availability of the content procured by the sending user, such that the receiving user may request delivery of the content from the third-party content provider. It may therefore be desirable to be able to provide notification of the availability of such content procured by sending user to the receiving user within the familiar confines of the messaging app used by the sending and receiving users to communicate with each other. This provides a familiar and comfortable environment in which the receiving user may be notified of the availability of the content and via which the receiving user may gain access to the content.

Because in many cases the content for delivery to the receiving user has been paid for by the sending user, both the sending user and the third-party content provider may wish to restrict access to the content to the intended receiving user or to a group of intended receiving users. Further, even if the content for delivery to the receiving user does not require payment, but instead may constitute sensitive material stored on the cloud storage device, the sending user may wish to restrict access in a similar manner.

Notification of the availability of content to the receiving user or users may occur through a messaging app which may facilitate secured E2E messaging capability between the sending user and receiving user. Using a secured messaging application, messages exchanged in this manner may be encrypted prior to sending using a public/private key encryption scheme in which the sender of the message crypts the message prior to sending the message using a public key of the receiving user. When the receiving user receives the message, it may be decrypted by the recipient using a private key of the recipient associated with the public key used by the sender of the message to encrypt the message. It is common practice that such messaging apps provide means for users sending and receiving encrypted messages to have one or more public keys of the other user, such as to enable encryption of the messages before sending them. As such, it would be desirable to leverage the availability of the public keys of the receiving user to facilitate the authorization of content delivery to the receiving user without the sending user having to provide other identifying information of the receiving user to the third-party content provider.

In an exemplary embodiment, the sending user accesses content provided by a third-party content provider and may select content for delivery to a receiving user or a group of receiving users using the methods mentioned above, namely, a third-party specific app installed on the client's device, a generic web browser accessing the content via a webpage of the third-party content provider or a messaging bot accessed from within the messaging application. Any other methods of accessing content of the third-party content provider currently known or unknown may also be used to access the content and select the content for delivery to a receiving user. The sending user may then inform the third-party content provider that the content should be shared with the receiving user.

In response, the third-party content provider may send a block of metadata to the messaging app on the sender's device. The metadata block is not meant to display to the sending user, but instead contains data necessary to facilitate the sharing of the content. The block of metadata may be sent directly to the messaging app on the sending user's client device or may reach the messaging app via an app specific to the third-party content provider installed on the sending user's client device and transferred to the messaging app via inter-application communication channels. The data block may contain a "magic link" which is a URL containing session specific information for the session in which the sending user has selected the content for delivery to the receiving user. Alternatively, the data block may contain a URL which simply identifies the content selected by the sending user for delivery to the receiving user using a unique ID of the content as a parameter to the URL. The data block may also include sharing metadata, which may include various information, for example, pre-flight information, which may include conditions which must be met before the messaging app sends notification to the receiving user, payment information, which may include information regarding payments made by the sending user to the third-party content provider for provision of the content, and a rendering schema which specifies the manner in which the notification of the availability of the content will be displayed in the messaging app of both the sending user and receiving user. Prior to sending the data block to the sending user's device, the data block may be sent to the messaging server associated with the messaging app for electronic signature to verify the contents of the metadata block. The third-party content provider will store the metadata block in a local database for later access.

Because the sending user is engaged in an encrypted E2E messaging interaction with the receiving user, the sending user will have one or more public keys of the receiving user available for encrypting content to be sent to the receiving user. In response to receiving the metadata block from the third-party content provider, the sending user provides a public key of the receiving user to the third-party content provider. Upon receipt of the public key of the receiving user, the third-party content provider will store the public key in a local database associated with the data block which had previously been sent to the sending user.

Upon receiving an acknowledgment that the third-party content provider has received the public key of the receiving user, the sending user may send the URL identifying the content to the receiving user via the messaging app. Other data from the data block may also be sent to the receiving user. For example, the sending user may include a key ID identifying which of the receiving user's public keys was sent to the third-party content provider. Additionally, the rendering schema portion of the metadata may be sent to the receiving user to indicate to the messaging app on the receiving user's client device how the notification of the availability of the content should be displayed within the messaging app. Differing types of content may have different rendering schemes.

Upon receiving the notification of the availability of the content via the messaging app, the messaging app on the receiving user's client device will render the notification in the messaging app in accordance with the rendering schema. The rendering schema may specify, for example, but not limited to the background color of the notification or a background image to be displayed with the notification. The notification will typically involve displaying a hyperlink directed to the content. The receiving user may select the hyperlink by clicking on the hyperlink in the user interface of the messaging app. Upon selection of the hyperlink, the messaging app will create a digital signature of the URL using the private key associated with the public key provided to the third-party content provider by the sending user and will send the digital signature to the third-party content provider as an argument or parameter of the URL.

When the third-party content provider receives the digital signature, it will retrieve the metadata block sent to the sending user and the public key of the receiving user from the local database and will verify the signature using the receiving user's public key. If the verification is successful, the receiving user is granted access to the content and the content is delivered to the receiving user.

Depending on the type of content, the content may be presented to the receiving user in the messaging app or in an app specific to the third-party content provider. In some cases, the content may be ephemeral and may expire after a predetermined number of accesses or after a predetermined length of time. The receiving user is prevented from sharing the link with other users as the receiving user is the only user capable of successfully digitally signing the URL. Additionally, each signature may only be used once.

Reference is now made to the drawings, wherein like reference numerals are used to refer to like elements throughout. In the following description, for purposes of explanation, numerous specific details are set forth to provide a thorough understanding thereof. However, the novel embodiments can be practiced without these specific details. In other instances, well known structures and devices are shown in block diagram form to facilitate a description thereof. The intention is to cover all modifications, equivalents, and alternatives consistent with the claimed subject matter.

In the Figures and the accompanying description, any use of the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in connection with any type of network in which users interact. Exemplary embodiments are particularly useful in the context of a social network and/or a messaging system. An overview of an exemplary social network and messaging system is provided in the next section.

System Overview

Various embodiments are generally directed to techniques for maintaining connectivity to a messaging application while allowing for the active account on the messaging application to be changed.

FIG. 1 depicts an example of a system in which one or more users 102 interact with a messaging system and/or a social networking system using a client 100. The client 100 may be a mobile device, such as a phone, a tablet computer, or a mobile computer, or may be another type of computing device, such as a desktop computer or workstation.

The client 100 may include a memory 104 supporting a messaging client 106 that provides messaging services to the one or more users 102. The messaging services may include the ability to send and/or receive messages using the messaging client 106. One or more of the users 102 of the client 100 may be associated with account settings 108 defining configuration options and/or preferences for the users 102 with respect to the messaging service. The account settings 108 may include stored login credentials, including user names, passwords, and/or pin characters, for the users 102, if the users 102 authorize the messaging client 106 to store their login credentials.

The messaging client 106 may be associated with and/or may interact with a social networking application that provides social networking services.

The client 100 may use a network 110, such as the Internet, to access a messaging server 120 that provides a messaging service and/or to access a social networking server 130 that provides a social networking service.

The messaging server 120 may include a network interface 122 for receiving information from the network 110. The network interface 122 may forward the information to messaging logic 124, which may process the information in view of a user's messaging preferences 126 to transmit messages or conversations between two or more users.

The social networking server 130 may also include a network interface 132 for receiving information from the network 110. The information may be used by the social networking server 130 to update or maintain a social graph 200 in view of different users' social networking preferences 136. The social networking server 130 may also include functionality to present the information to users of a social network, such as through messages, posts, etc.

Figure 2:
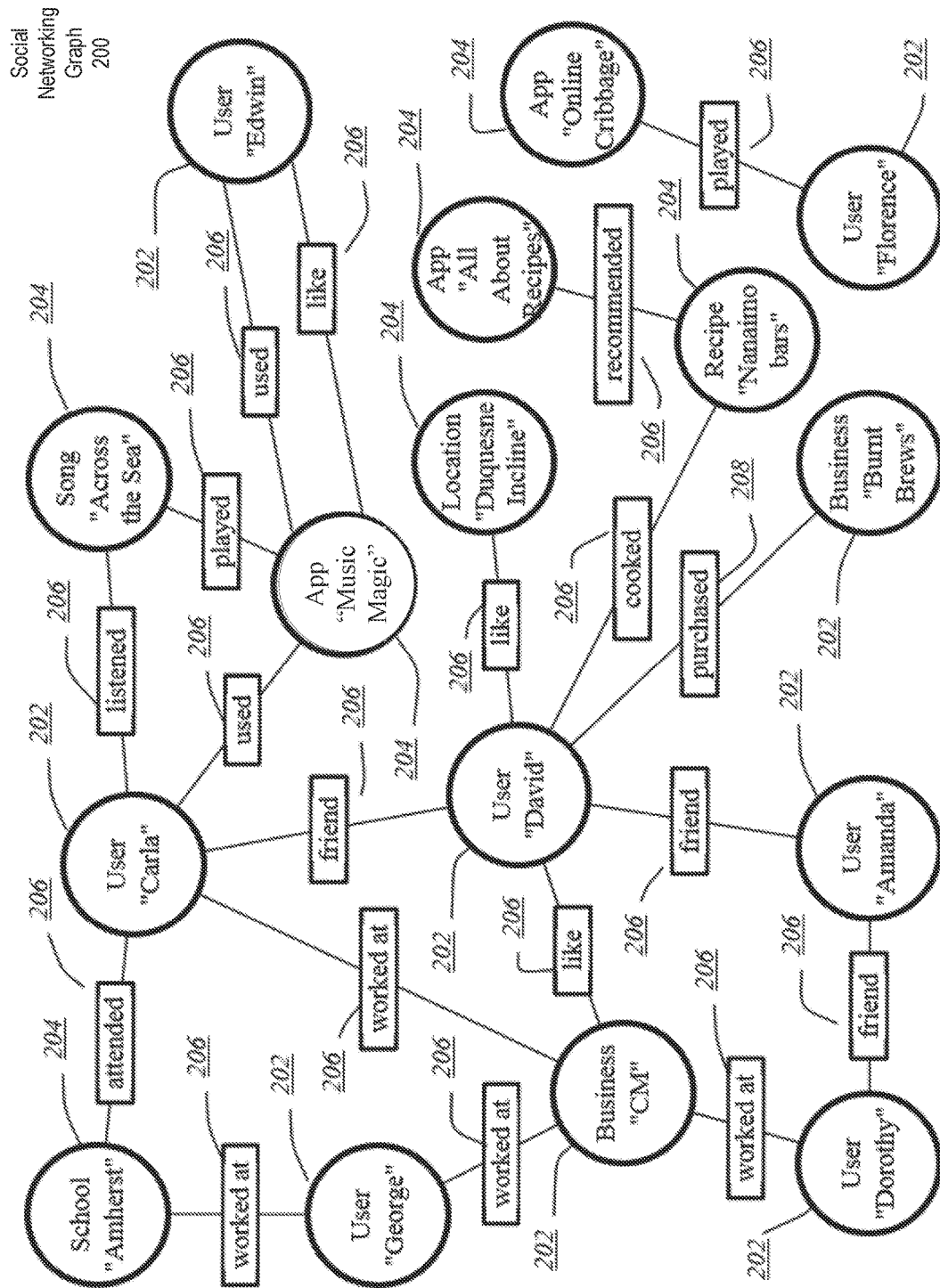
FIG. 2 depicts an exemplary social networking graph.

FIG. 2 illustrates an example of a social graph 200 in more detail. The social graph 200 may define relationships between entities in the social network. In exemplary embodiments, a social networking service may store one or more social graphs 200 in one or more data stores as a social graph data structure via the social networking service.

The social graph 200 may include multiple nodes, such as user nodes 202 and concept nodes 204. The social graph 200 may furthermore include edges 206 connecting the nodes. The nodes and edges of social graph 200 may be stored as data objects, for example, in a data store (such as a social-graph database). Such a data store may include one or more searchable or queryable indexes of nodes or edges of social graph 200.

The social graph 200 may be accessed by a social networking server, a client system, a third-party system, or any other approved system or device for suitable applications.

A user node 202 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 202 corresponding to the user and store the user node 202 in one or more data stores. Users and user nodes 202 described herein may, where appropriate, refer to registered users and user nodes associated with registered users. In addition, or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example, and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example, and not by way of limitation, a profile page corresponding to a particular external webpage may be the particular external webpage and the profile page may correspond to a particular concept node 204. Profile pages may be viewable by all or a selected subset of other users. As an example, and not by way of limitation, a user node 202 may have a corresponding user-profile page in which the corresponding user may add content, make declarations, or otherwise express himself or herself. A business page may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example, and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores.

In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example, and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example, and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Magic, an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (Music Magic) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example, and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2) between user node 206 for user "Edwin" and concept node 204 for "Music Magic").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example, and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to a consumer-to-business service and the consumer-to-business service may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

As such, the social graph 200 may be used to infer shared interests, shared experiences, or other shared or common attributes of two or more users of a social-networking system. For instance, two or more users each having an edge to a common business, product, media item, institution, or other entity represented in the social graph 200 may indicate a shared relationship with that entity, which may be used to suggest customization of a use of a social-networking system, including a messaging system, for one or more users.

Figure 3:
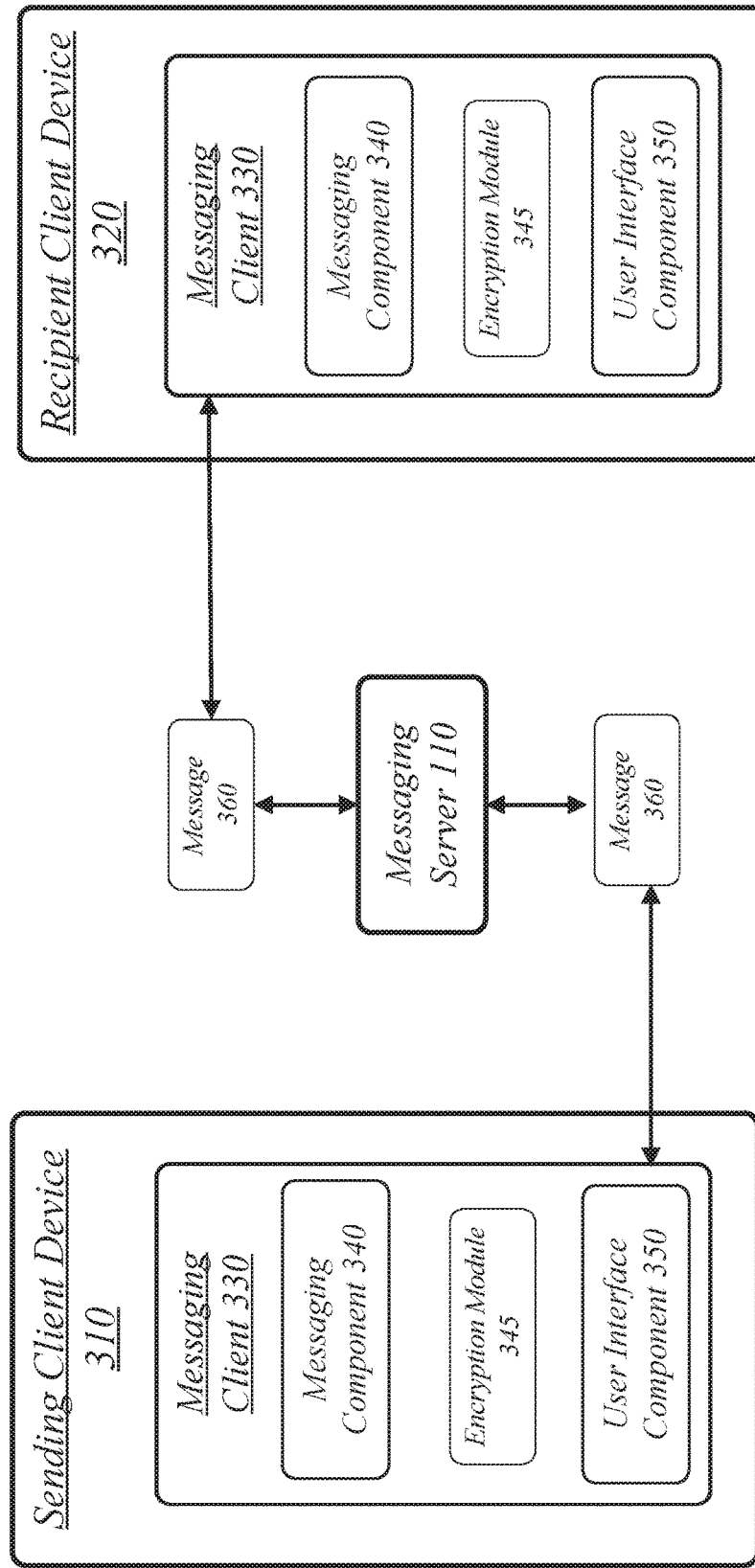
FIG. 3 illustrates an embodiment of a messaging system for transmitting end-to-end (E2E) messages between a sending client device and a recipient client device.

FIG. 3 illustrates an embodiment of a messaging system 300 for transmitting end-to-end (E2E) messages 360 between a sending client device 310 and a recipient client device 320. Examples of E2E messaging systems include applications for sending and receiving text (SMS) messages or email, or other applications for exchanging messages, for example, WhatsApp® Messenger by WhatsApp, Inc., an application providing instant messaging and VoIP services.

A messaging client 330 may comprise a user interface component 350. The user interface component 350 may be generally arranged to provide a user interface allowing a user to access the functionality of the messaging client 330. For instance, the user interface component 350 may provide interfaces to message viewing, message composition, message sending, and other messaging functions. In general, the user interface component 350 may provide interfaces for any functionality of the messaging client 330.

The messaging client may comprise a messaging component 340. The messaging component 340 may be generally arranged to provide messaging services to a user of the client device 310. Messaging services may comprise the reception of messages, the sending of messages, the maintenance of a history of messages exchanged, and other messaging-related activities. A user of the messaging client 330 may be empowered to engage in messaging conversations with a plurality of other users in private user-to-user conversations, in private group conversations between three or more users, and in public conversations generally open to the messaging community. The messaging component 340 may expose this functionality to the user using the user interface component 350.

Client devices 310, 320 may communicate via a messaging server 110 through the exchange of messages 360. The messaging component 340 of the messaging client 330 on the sending client device 310 may transmit messages 360 from sending client device 310 to a messaging server 110 via a network, for example, the Internet. The messaging server 110 may receive the message 360 from the sending client device 310. The messaging server 110 may determine a user account associated with message 360, determine a recipient client device 320 as associated with the user account, and transmit the messaging 360 to the recipient client device 320 based on the recipient client device 320 being associated with the user account.

The messaging system 110 may determine a plurality of user accounts associated with a message thread, which may include the user account for the user of the sending client device 310 and one or more user accounts for other users engaged with the message thread, with more than one other user account being associated with the message thread being the case for group threads. Each of the user accounts, including the sender's user account, may have one or more client devices associated with it, such as where a user uses multiple client devices (e.g., a desktop computer and/or a smartphone and/or a tablet device) to access their user account with the messaging system 300. In this case, multiple public keys are provided to the content provider, one for each client device.

The messaging component 340 of the messaging client 330 on the recipient client device 320 may receive the message 360 from the messaging server 110. The messaging component 340 may determine a message thread associated with the message. The user interface component 350 of the messaging client 330 on the recipient client device 320 may then configure a user interface for the message thread to display message 360.

Sending client device 310 and recipient client device 320 may exchange encrypted messages as part of an E2E message exchange. Messaging client 330 may include encryption module 345 which generates a plurality of private/public message key pairs. Each private/public message key pair may be identified by a key ID. Each client device 310, 320 may provide a plurality of public keys of the private/public key pairs, and the corresponding key IDs to messaging server 110 and/or top other client device with which client device 3100 is currently exchanging E2E messages.

In one embodiment of the invention, if the sending client device 310 and recipient client device 320 are not currently engaged in an E2E messaging exchange, sending client device 310 may request messaging server 110 for a public key of the recipient client device 320, such that encryption module 345 of messaging client 330 at sending client device 310 may encrypt a message 360 using the public key of recipient client device 320 for transmission via messaging server 110 to recipient client device 320. In response, messaging server 110 may supply a public key of recipient client device 320 to encryption module 345 at sending client device 310, as well as the corresponding key ID. Encryption module 345 of sending client device 310 will then encrypt its message using the public key of recipient client device 320 and send the encrypted message 360 to messaging component 340 for transmission to recipient client device 320 via messaging server 110. Messaging component 340 of sending client device 310 will also send, in message 360, the key ID of the public key of recipient client device 320 which was used to encrypt message 360. To prevent tracking of user messages between client devices, public keys are meant to be one-use only keys. Therefore, upon sending the public key of recipient client device 320 to sending client device 310, messaging server 110 will delete the public key and the key ID from its local database and that public key will not be used again. Likewise, once sending client device 310 uses the public key to encrypt message 360, it will delete the public key.

When recipient client device 320 has received message 360 and the key ID from messaging server 110, the messaging component of the messaging client 330 at the recipient client device 310 will send the encrypted message 360 and the key ID to encryption module 345 for decrypting. Encryption module 345 of recipient client device 320 will match a private key corresponding to the public key used by sending client device 310 to encrypt the message, using the key ID. Encryption module 345 of recipient client device 320 may then decrypt the message 360 using the private key, and the message may be displayed by user interface component 350.

In other embodiments, a symmetrical encryption/decryption scheme may be used in which a commonly-derived elliptic curve Diffie-Hellman secret is used to sign the links.

In the event that sending client device 310 recipient client device 320 are currently engaged in an E2E messaging exchange using E2E messaging system 300, sending client device 310 and recipient client device 320 may exchange blocks of public keys, and the corresponding key IDs, with each other directly. As such, messaging server 110 has no knowledge of the keys used to encrypt messages 360 being sent between client device 310 and recipient client device 320. Again, because public keys are meant to be one use only keys, once a message 360 has been encrypted using a public key, that public key is deleted and not used again.

Figure 4:
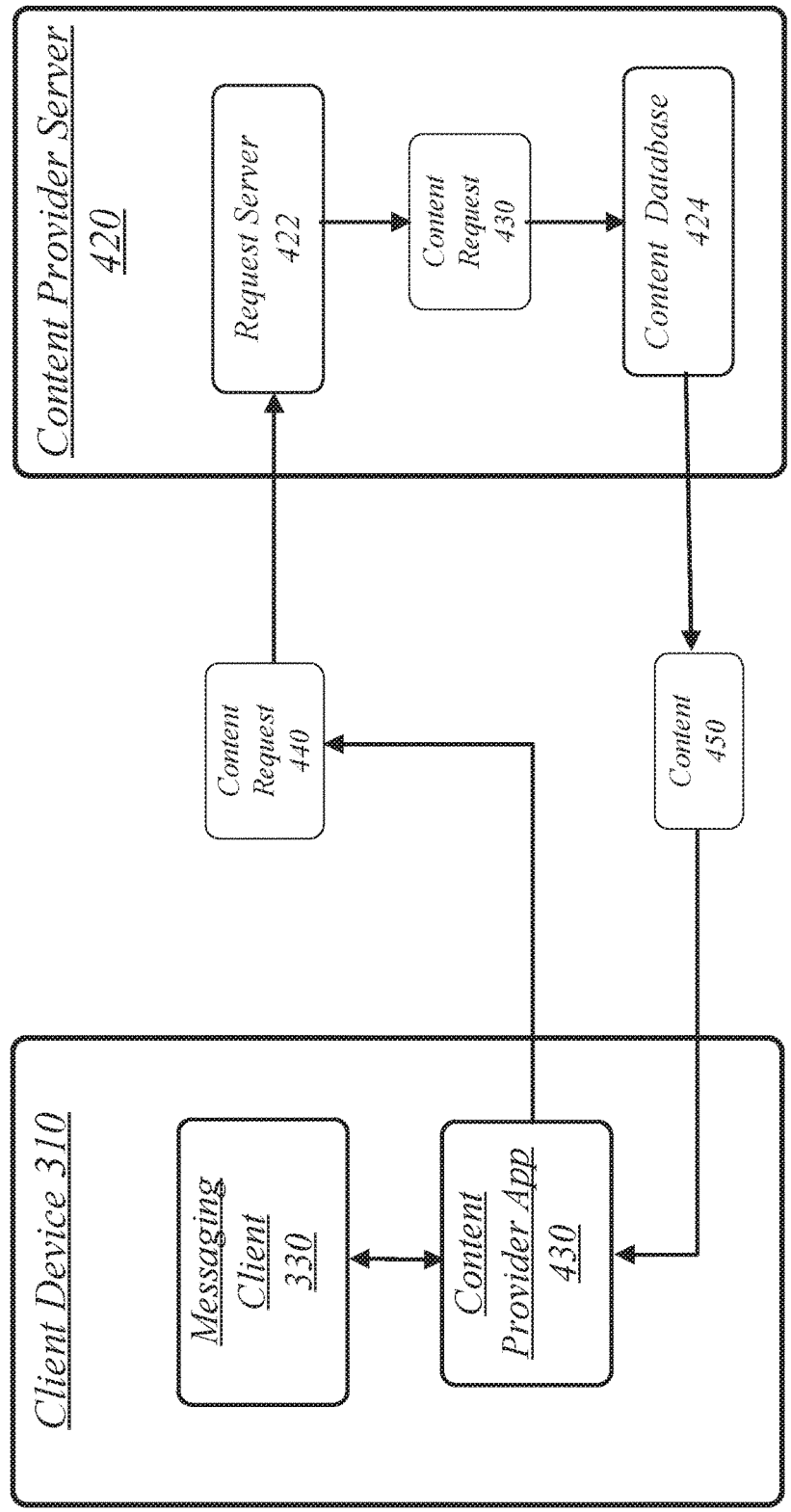
FIG. 4 illustrates an embodiment of a content delivery system for delivery of content from a content provider server to a client device.

FIG. 4 illustrates an embodiment of a content delivery system allowing a client device 310 to request content 450 for delivery from a content provider server 420. Content provider server 420 may be a server of content 450, which may include digital media for consumption by a user of client device 320, for example, media files, including photo files, video files and audio files and, other types of digital media, including, for example, electronic books. Content provider server 420 may be associated with a merchant and the content 450 may further comprise, for example, a gift card. Content provider 420 may further be associated with a cloud storage service, wherein the content 450 may be private files of a user of client device 310.

Client device 310 may have a content provider app 430 installed which may be specific to content provider server 420 and which may provide a secure interface to content provider server 420. A user at client device 310 may use content provider app 430 to browse, select and view content 450 served by content provider server 420. A content request 440 may be generated by content provider app 430 for delivery of specific content 450 from content provider server 420 to client device 310 and may be transferred from content provider app 430 to the content provider server 420 via a direct network connection.

Client device 310 may also have a messaging client 330 installed which may be used to request and receive content 450 from content provider server 420. For example, messaging client 330 may receive a message 360 from another client device containing a link in the form of a URL to specific content stored in content database 424 on content provider server 420. When a user at the client device 310 clicks on the link, the messaging client 330 may generate a content request 440 and may send the content request 440 to content provider server 420 via messaging server 110. In an alternate embodiment, messaging client 330 may have a message bot specific to content provider 420 through which a user of client device 319 can interact with content provider server 420. In yet another alternate embodiment, messaging client 330 may bring content provider app 430 to the foreground via an inter-application interface and content request 440 may be generated by content provider app 430 and transferred to content provider server 420 via direct network connection.

Content provider 420 may receive content request 440 and the request may be processed by request server 422. Request server 422 may send the content request 440 to content database 422 for look up and retrieval of content 450. Request server 422 may return status and/or error messages to client device 310. Content 450 may be sent via direct network connection to the content provider app 430 on client device 310 or, alternatively, may be sent as a message to a messaging client 330 on client device 310 via a messaging server 110.

When client device 310 receives content 450 from content provider server 420, client device 310 may display content 450 using either the user interface component 350 of messaging client 330 or using the content provider app 430. In some embodiments, even if content 450 is received by messaging client 330 at client device 310 via messaging server 110, the content 450 may still be displayed in the content provider app 430 by having messaging client 330 send content 450 the content provider app 430 via inter-application communications channels and bring the content provider app 430 to the foreground.

Content provider server 420 may require payment for delivery of content 450. Payment may be, for example, on a per item basis or may be based on a subscription service. Payment may be made by a user at sending client device using content provider app 430 to access an account at content provider server 420 associated with the user of client device 310. Alternatively, a user at client device 310 may have an account for payment set up with messaging server 110 and payment may be made to the messaging server 110. In this embodiment, messaging server 110 may send a payment token to content provider server 422 verify payment for content 450.

Content Sharing System

Figure 5:
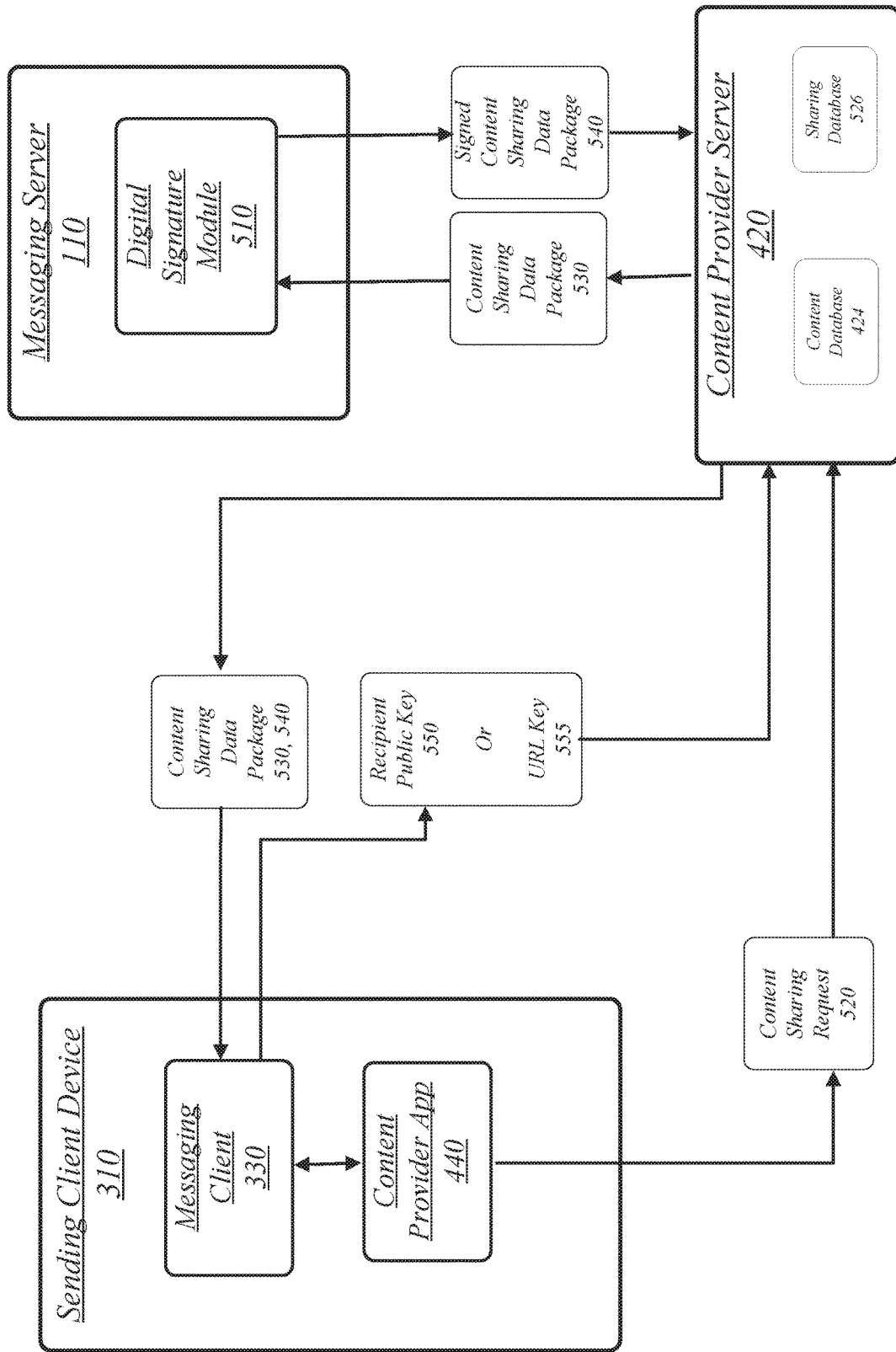
FIG. 5 illustrates an embodiment of a content sharing system allowing content at a content provider server to be shared by sending client device to a recipient client device prior to completion of the pre-flight activities.

FIG. 5 shows an exemplary embodiment of a content sharing system 500 prior to the completion of the pre-flight activities. In certain circumstances, and, as previously discussed, content provider server 420 may in some instances require payment for content 450 before it is delivered to client device 310. Also as previously discussed, in some instances, a user at a sending client device 310 may wish to share content with a second user at a recipient client device 320. In some instances, a user at sending client device 310 may wish to gift content 450 requiring payment to a user at a recipient client device 320. Content sharing system 500 is designed to allow the sharing of secured content from a sending client device 310 to a recipient client device 320 without compromising the privacy of a user of recipient client device 320. In this case, "secured content" is meant to include both content requiring payment for delivery and/or content for which the user at sending client device 310 only wishes to grant access to a specific user at a recipient client device 320.

Pre-Flight Processing

Pre-flight processing refers to steps which must be taken before the link to the content 450 generated by content provider server 420 becomes active and therefore before sending client device 310 can send the link for the secured content 450 to the recipient client device 320. Sending client device 310 and recipient client device 320 may have messaging client 330 installed thereon which is an app providing a specific interface with messaging server 110. WhatsApp® Messenger by WhatsApp Inc., is an example of such a messaging application. Additionally, sending client device 310 and recipient client device 320 may also have a content provider app 430 installed which is associated with and which provides a specific interface to content provider server 420, and which may be designed specifically to interact with content provider server 420. One or both of messaging client 330 and content provider app 430 may be part another app, for example, an app providing access to a social networking service, such as Facebook®.

A user at sending client device 310 may use content provider app 430 to browse, view and select content stored in content database 424 at content provider server 420, as previously described. The user at sending client device 310 may select content for sharing with a user at recipient client device 320. Content provider server may provide an option, via content provider app 430 to share content 450 using messaging client 330. When the user at client device 310 selects the option to share content 450 using messaging client 330, a content sharing request 520 may be generated by content provider app 430 and sent to content provider server 420. Content sharing request 520 may include, among other items, an identification of the content that the user sending client device 310 wishes to share with the user of recipient client device 320.

Upon receiving the content sharing request 520, request server 422 at content provider server 420 will begin processing of the request by creating a link 610 to the requested content 450 as well as a content sharing data package 530 comprising link 610 and a block of sharing metadata 620 containing various sections, which will be explained in detail later. The link 610 may be a URL specifically identifying the requested content 450 or may be a "magic link" containing a session identifier parameter which may provide access to the session between the content provider app 430 on sending client device 310 and content provider 420 in which the requested content 450 was selected. The magic link is similar to the type of link which may be emailed to a user who has forgotten a password at a particular website which, when clicked on by the user, allows user to change the password without further identifying information. Content provider server 420 will store the content sharing data package 530 in sharing database 526 and send content sharing data package 530 to messaging client 330 on sending client device 310.

Figure 6:
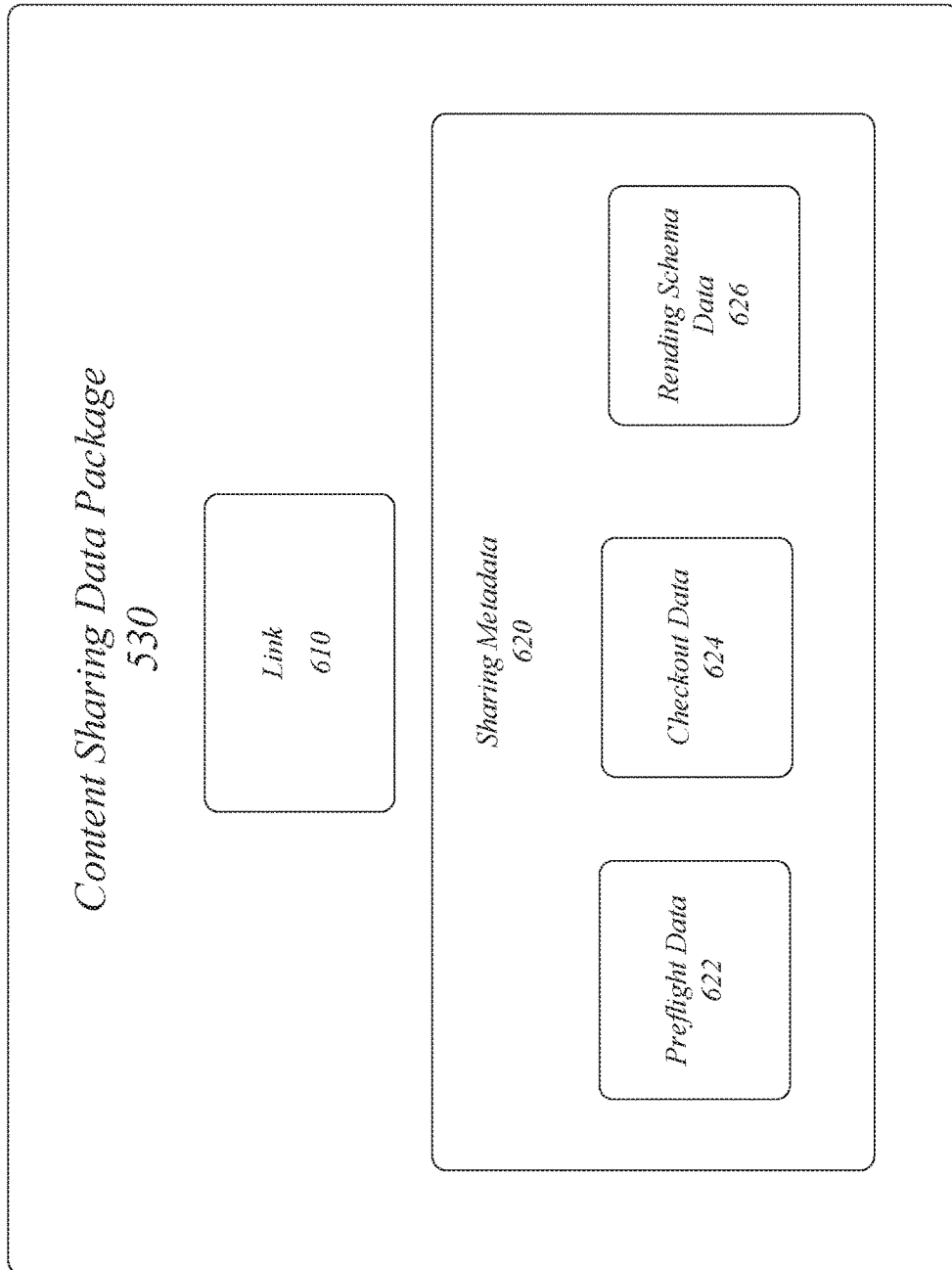
FIG. 6 is a block diagram of the content sharing data package sent from the content provider server to the sending client device prior to the completion of the pre-flight activities.

FIG. 6 shows a detailed view of content sharing data package 530. Content sharing data package 530 includes link 610 to content 450 that the user at sending client device 310 wishes to share with the user at recipient client device 320. Content sharing data package 530 also includes a block of sharing metadata 620. Sharing metadata 620 may include pre-flight data 622, checkout data 624 and rendering schema data 626, and may optionally include other data.

Pre-flight data 622 provides indications of actions that must be taken by the messaging client 330 on sending client device 310 prior to the sending of link 610 to recipient client device 320. Information in pre-flight data 622 may include, for example, the method by which the recipient client device 320 will validate its identity to the content provider server 420, whether or not the content sharing data packages has been signed by the messaging server 110 associated with messaging client 330, and a URL indicating a location to which the sending client device 310 must send information required to verify the identity of the recipient client device 320.

Sharing metadata 620 may also optionally include checkout data 624. For content requiring payment to be made to content provider server 420, a facility may be provided through the content provider app 430 to make the payment directly with content provider server 420. However, in some instances, a user at sending client device 310 may have a payment account, including a method of payment, set up with messaging server 110 and may prefer that payment be deferred and processed using the account at messaging server 110. In this case, the user may indicate to content provider server 420 that payment will be made using messaging server 110. In such instances, checkout metadata 624 may include, among other items, a flag indicating that payment is still required, an amount of the payment, and a URL indicating where proof of payment should be posted to the content provider server 420. In instances where no payment is required for delivery of the content or when content has been made to content provider server 420 via content provider app 440, the checkout metadata 624 section of the content sharing data package 530 may be absent or blank.

The sharing metadata 620 of content sharing data package 530 may also include rendering schema data 626, which specifies how the message 360 in which the link to the shared content 450 is delivered should be displayed in the user interface component 350 of messaging client 330 on both the sending client device 310 and the recipient client device 320. Rendering schema data 626 may include, for example, an identifier of a template as well as arguments for the template. The template may include, but not limited to, for example, the color of the bubble in which the messages displayed, special graphics that should be displayed along with the notification of the link, font, size of text, etc. The rendering schema data 626 may also include a URL specifying a background image for the rendering of the message which may be retrieved from the content provider server 420.

To ensure the integrity of the data in the content sharing data package 530, in particular, the URL to which the information required to verify the identity of the recipient client device 320 must be sent, content provider server may optionally have the content sharing package 530 signed by messaging server 110. Content provider server 420 may send a request for the signing of content sharing data package 530 to messaging server 110. The request may include the content sharing data package 530 as well as a set of identifying credentials of content provider server 420 which guarantees that the content sharing data package 530 originated at content provider server 420. A digital signature module 510 at messaging server 110 will digitally sign content sharing package 530 using a private key of messaging server 110. Digital signature module 510 will then return the signed content sharing data package 540 to the content provider server 420. Upon receiving the signed content sharing data package 540, content provider server 420 will store the signed content sharing data package 540 in the sharing database 526 in place of the unsigned content sharing data package 530. The content sharing data package may contain both signed and unsigned portions, however, as used herein, any content sharing data package 530 containing a signed portion is referred to herein as a signed content sharing data package 540.

Referring back now to FIG. 5, content sharing data package 530 or signed content sharing data package 540 will be sent from content provider server 420 to messaging client 330 on the sending client device 310. Messaging client 330 is responsible for performing the pre-flight actions prior to sending the link 610 to the recipient client device 320. Note that the sharing metadata 620 portion of the content sharing data package 530 is used by messaging client 330 to process requests but is not displayed to or otherwise exposed to the user.

If messaging client 330 has received a signed content sharing data package 540, messaging client 330 must verify the signature applied to the signed content sharing data package 540 by the digital signature module 510 of messaging server 110. Because messaging client 330 is specifically associated with messaging server 110 (i.e. is an app designed to interface directly with messaging server 110) messaging client 330 is aware of public keys associated with messaging server 110 and may use a public key of messaging server 110 to verify the digital signature of the signed content sharing data package 540. If messaging client 330 receives an unsigned content sharing package 530, the verification step is unnecessary.

The pre-flight data block 622 of content sharing data package 530 may also indicate the method by which the identity of the recipient client device 320 is to be verified to the content provider server 420. In a first embodiment, messaging client 330 may send a recipient public key 550 of recipient client device 320 to content provider server 420. The recipient public key 550 is known by the messaging client 330 on the sending client device 310 by virtue of its engagement with the recipient client device 320 in an E2E encrypted messaging exchange, as described above with respect to FIG. 3. Content provider server 420 may receive the recipient public key 550 and may store the recipient public key 550 in the sharing database 526 and associate it with the content sharing data package 530 or the signed content sharing data package 540.

In the event that messaging client 330 on sending client device 310 does not have a recipient public key 550 (because sending client device 310 and recipient client device 320 are not currently engaged in an E2E encrypted messaging exchange), messaging client 330 on sending client device may query messaging server 110 for delivery of a recipient public key 550, whereupon messaging server 110 will return the recipient public key 550 to the messaging client 330 on the sending client device 310 and delete the public key from its database.

In an alternate, secondary embodiment, content sharing data package 530 may indicate that messaging client 330 on sending client device 310 is to create a URL key 555 in lieu of providing the recipient public key 550. The URL key 555 comprises a hash-based message authentication code (HMAC) using the public key of the recipient used to encrypt the current message and the URL 620 of the content 450 on content provider server 420. The HMAC may be calculated using, for example, the SHA256 hash function: URL key 555=HMAC-SHA256 (current message key, URL). When the URL key 555 has been created by the messaging client 330 it is sent to content provider 420 where it is stored in the sharing database 526 and associated with the content sharing data package 530 or the signed content sharing data package 540.

Once the recipient public key 550 or, in the secondary embodiment, the URL key 555, is sent to the content provider server 420 and stored in sharing database 526, content provider server 420 will send an acknowledgment to messaging client 330 on sending client device 320. At this point, the pre-flight actions are completed and the messaging client 330 of sending client device 310 may send the URL to the recipient client device 320. At any time up to this point, the user at sending client device 320 may cancel the operation.

Rendering Process

Figure 7:
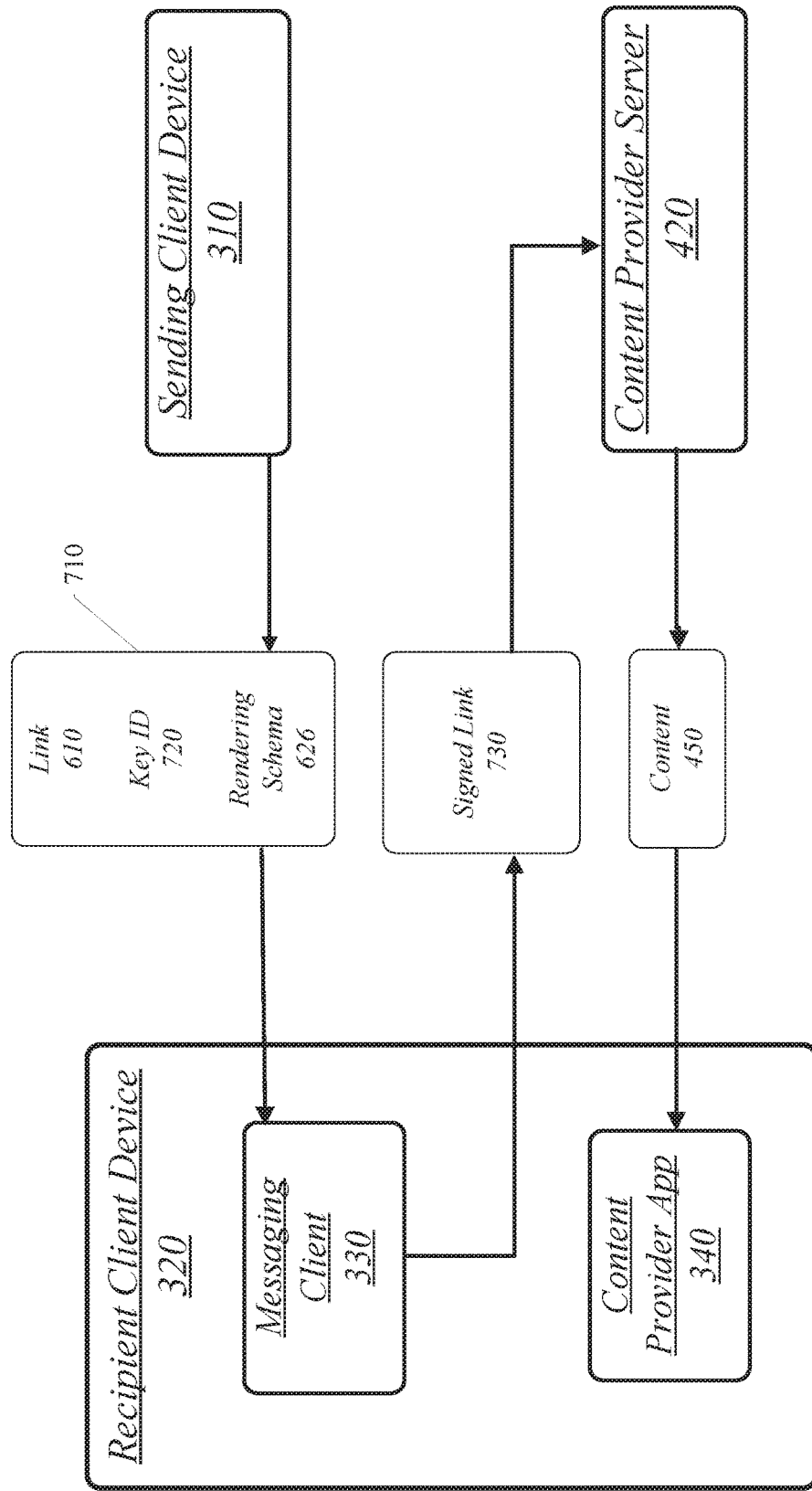
FIG. 7 shows an embodiment of the content sharing system after completion of the pre-flight activities.

FIG. 7 shows an embodiment of the content sharing system 500 after completion of the pre-flight activities. In the first embodiment, wherein the messaging client 330 has sent the recipient public key 550 to the content provider server, the messaging client 330 on the sending client device 310 will send a message 710 to the messaging client 330 on the recipient client device. Message 710 comprises URL 620, the key ID of the recipient public key 550 which was sent to the content provider server 420 and, optionally, the rendering schema data 626 portion of the sharing metadata 620 from the content sharing data package 530, such that the user interface component 350 of the messaging client 330 of the recipient client device 320 may correctly render the message in the user interface of messaging client 330 on recipient client device 320. Once his message has been sent the messaging client 330 on sending client device 310 deletes the recipient public key 550. In the second, alternate embodiment of the invention, in the key ID 720 is the ID of the public key of recipient client device 320 that was used to create the URL key 555 which was sent to the content provider server 420 by sending client device 310.

User interface component 350 of messaging client 330 on recipient client device 320 will render message 710 in the user interface of messaging client 330 in accordance with the rendering schema 626 received as part of message 710. Preferably, the rendering of message 710 will include at least a visual representation of link 610. Also preferably, key ID 720 and rendering schema 626 should not be exposed for display by the user interface component 350 of messaging client 330. Once the user of recipient client device 320 selects link 610 in the user interface component 350 of messaging client 330, the messaging client 330 on recipient client device 320 must verify its identity to content provider server 420 before receiving content 450.

To verify the identity of recipient client device 320 to content provider 420, in the first embodiment of the invention, wherein the recipient public key 550 has been sent the content provider 420, the messaging client 330 on recipient client device 320 retrieves the private key corresponding to the recipient public key 550 using key ID 720. In preferred embodiments of the invention, the recipient private key corresponding to recipient public key 550 is used to digitally sign an iteration count indicating how many times the content has been accessed by recipient client device 320, and the signed iteration count is appended as an argument or parameter to URL link 610 by messaging client 330, thereby creating signed link 730. Messaging client 330 may track, and the local iteration count, how many times the user of recipient client device 320 has selected link 610 to access content 450. In alternate embodiments of the invention, other information, for example, a hash of the URL, may be digitally signed using a private key of the recipient client device 320 to create signed link 730.

In the alternate secondary embodiment described above, wherein a URL key 555 is created, the messaging client 330 on recipient client device 320 is able to re-create the URL key 555 which was created by sending client device 310 and sent the content provider server 420 by using key ID 720 to retrieve the public key that sending client device 310 used to create the URL key 555, as described above. The messaging client 330 on recipient client device 320 re-creates the URL key 555 in the same manner as the sending client device 310. The URL key 555 is then appended as an argument or parameter to link 622 create signed link 730.

Recipient client device 320 then sends signed link 730 to content provider 420. Upon receiving signed link 730, content provider 420 will retrieve the content sharing data package 530 or the signed content sharing data package 540 and the recipient public key 550 or the URL key 555 associated with the content sharing data package 530 from sharing database 526. In addition, content provider server 420 may have stored, in sharing database 526, an iteration count indicating how many times recipient client device 320 has accessed content 450.

In the first embodiment of the invention, the content provider server will extract the signed iteration count (or other signed data) from the signed link 730 and will use the recipient public key 550 retrieved from sharing database 526 to verify the signature on the iteration count signed by recipient client device 320. Once the signed iteration count is verified, the identity of the recipient client device 320 as the rightful recipient of content 450 is confirmed. If the iteration count specified in signed link 730 is greater than the iteration count stored in sharing database 526, access to content 450 is granted and content 450 is sent to recipient client device 320. Each time messaging client 330 generates a signed link 730 and increments its iteration count and every time content provider 420 receives a signed link 730, it increments the iteration count stored in sharing database 526. As such, each signed link 730 may only be used once. This prevents sharing of the signed link 730 by a user of recipient client device 320 with the user of another client device, even by direct cutting and pasting of the signed link 730.

In the alternate, secondary embodiment of the invention, in which the URL key 555 is appended to the link 610 to create the signed link 730, content provider 420, upon receiving signed link 730, will extract the URL key 555 and will match it with the URL key 555 provided by the sending client device 320, which was stored in sharing database 526. In this embodiment, sharing of the signed link 730 may be prevented by ratcheting the URL key 555. To ratchet the URL key 555, a URL chain key is created by hashing the URL key 555 and an iteration count and appending the URL chain key as the argument to link 610 to create signed link 730 instead of the URL key 555. When content provider server receives signed link 730, it can re-create the URL chain key using a local version of the iteration count and the URL key 555 provided by the sending client device 310, both of which are stored in the sharing database 526.

Recipient client device 320, upon receiving content 450, may display the content in content provider app 430 or directly in the user interface component 350 of messaging client 330 using the rendering schema 626.

The access of the recipient client device 320 to content 450 can be made ephemeral. This can be accomplished in one of two ways. Because the content provider server 420 stores and iteration count in sharing database 526, when the iteration count exceeds a predetermined threshold, access to content 450 may be foreclosed and further requests for content 450 received from recipient client device 320 denied by content provider server 420. Likewise, content provider server 420 may store a predetermined time period in sharing database 526 during which recipient client device 320 can request access to content 450. Further requests for access to content 450 received from recipient client device 320 after the expiration of the predetermined time period will result in the denial by the content provider server 420 to provide content 450.

Figure 8:
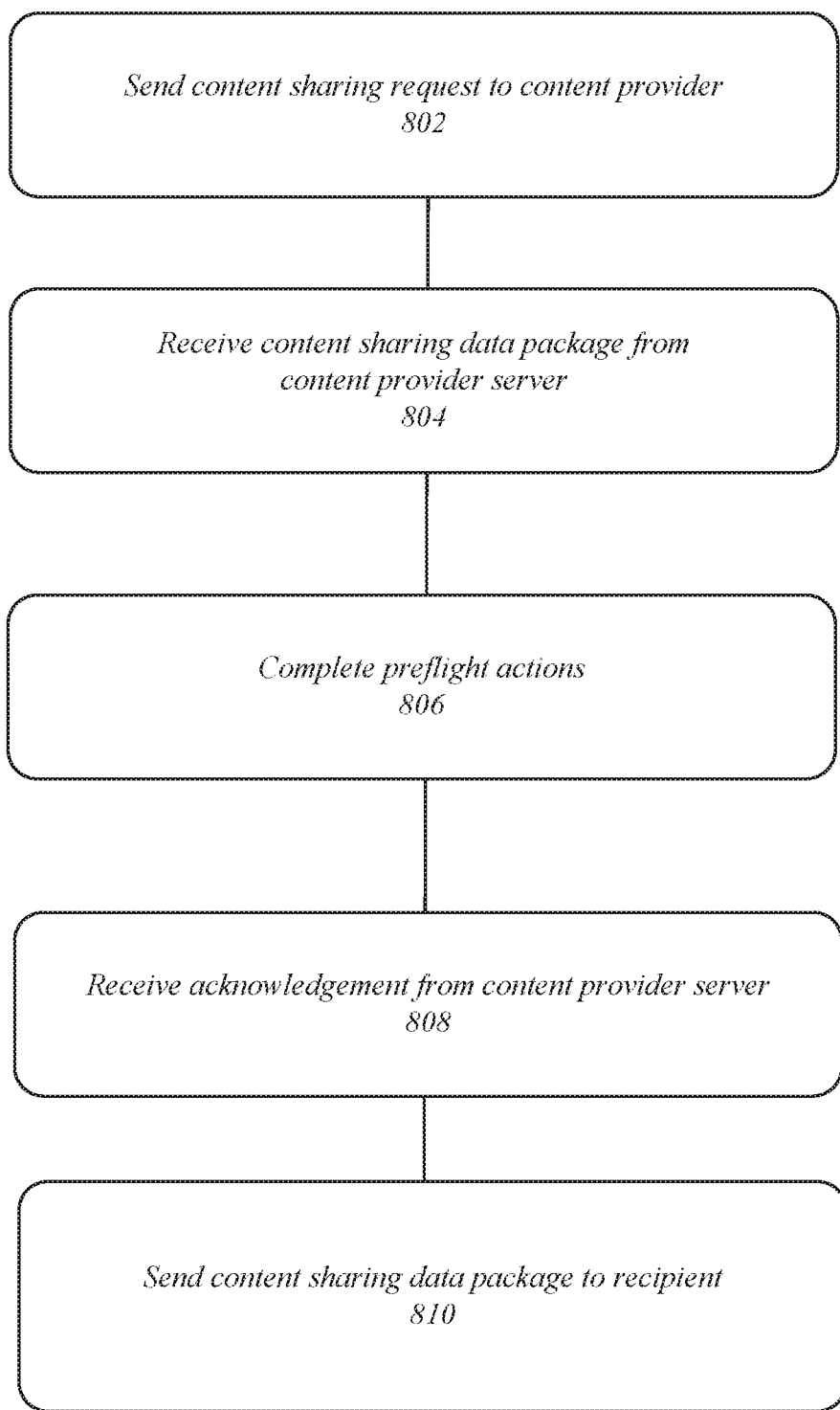
FIG. 8 is flowchart showing the pre-flight actions undertaken by the sending client device.

FIG. 8 is flowchart showing the pre-flight actions undertaken by the sending client device 310. At 802, the sending client device 320 sends content sharing request 520 to content provider server 420. At 804, the content sharing data package 530 is received from content provider server 420. At 806, sending client device 320 completes all pre-flight actions specified in the content sharing data package 530, including, for example, determining the method to be used for generating the verifying signature to verify the identity of the recipient client device 320, processing any delayed payments through messaging server 110 and sending the verification information (i.e. the recipient public key 550 or the URL key 555) to the content provider server 420. At 808, sending client device 310 receives acknowledgment from content provider server 420 and, at 810 sends a message to the recipient client device 320 which includes link 610 received as part of content sharing data package 530, a key ID 720 used to identify the public key used by the sending client device to create the identity verifying information, and the rendering schema 626.

Figure 9:
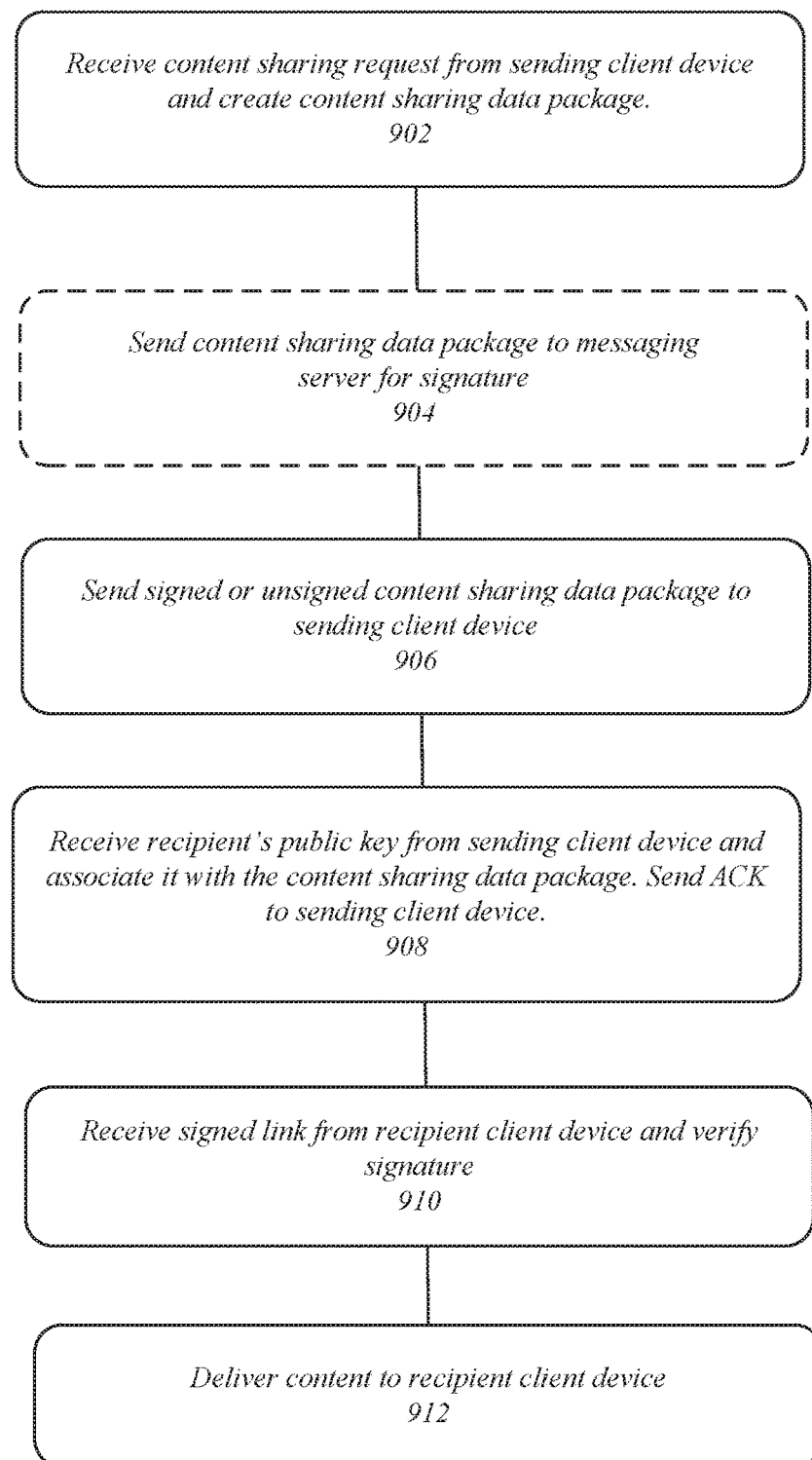
FIG. 9 is a flowchart showing the actions undertaken by the content provider server to generate the metadata block and verify the signature of the receiving user.

FIG. 9 is a flowchart showing the actions undertaken by the content provider server 420. At 902, content provider server 420 receives a content sharing request 520 from sending client device 310 and creates a content sharing data package containing link 610 and shared metadata 620. At 904, content provider server 420 optionally sends content sharing data package 530 to messaging server 110 for signature and receives signed content sharing data package 540 from messaging server 110. At 906, content provider server 420 sends the unsigned or signed content sharing data package 530, 540 respectively, to sending client device 310 and stores the content sharing data package 530,540, in sharing database 526. At 908, content provider server 420 receives, from sending client device 310, the recipient's public key 550 or, alternatively, the URL key 555 generated by sending client device 550 and stores it in sharing database 526 associated with the content sharing data package 530 or signed content sharing data package 540. An acknowledgment is then sent to sending client device 310. At 910, content provider server 420 receives a signed link 730 from recipient client device 320 and verifies the signature of the signed link 730 using the recipient's public key 550 or, alternatively, the URL key 555, both of which are stored in sharing database 526. At 912, once the verification is completed, the requested content 450 is retrieved from content database 424 and delivered to recipient client device 320.

Figure 10:
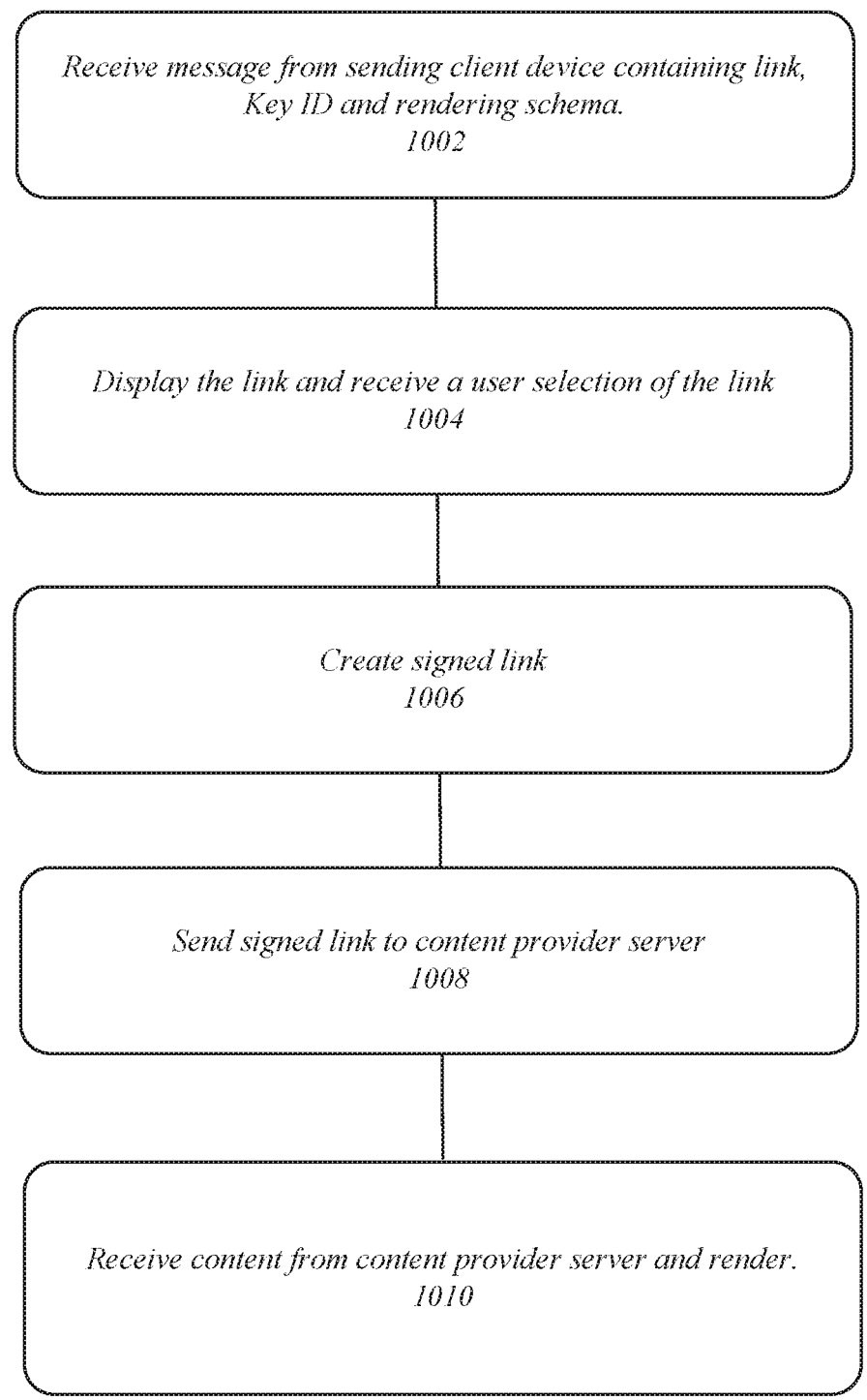
FIG. 10 is a flowchart showing the actions undertaken by the recipient client device to retrieve and view the content.

FIG. 10 is a flowchart showing the actions undertaken by the recipient client device 320. At 1002, receiving client device 320 receives message 710 from sending client device 310 containing link 610, key ID 720 and rendering schema 626. At 1004, recipient client device displays the link in the user interface of the messaging client 330 and receives a user selection of the link. At 1006, the recipient client device 320 creates the signed link 730 as described above and, at 1008, the signed link 730 is sent to the content provider server 420. At 1010, recipient client device 320 receives content 450 from content provider server 420 and renders content 450 using either content provider app 430 or messaging client 330, in accordance with the rendering schema 626.

Distributed Server System

Figure 11:
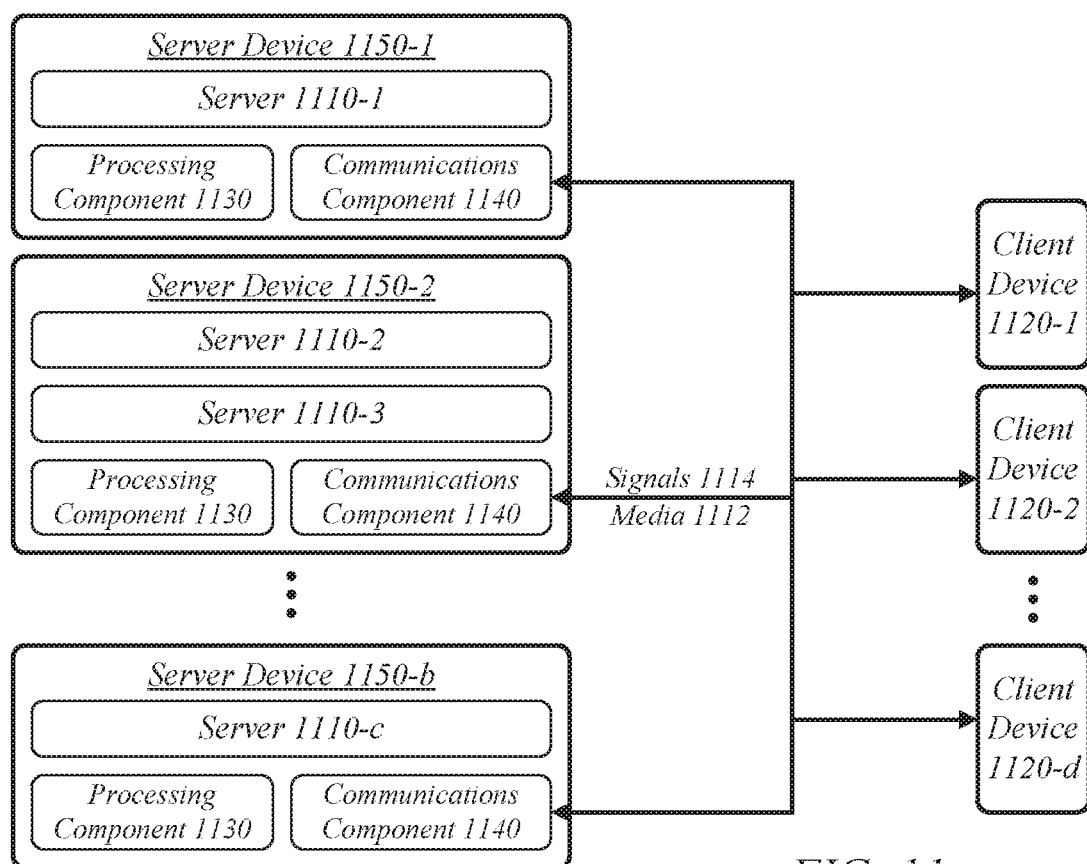
FIG. 11 illustrates an embodiment of a content delivery system allowing a client device to request content for delivery from a content provider server.

FIG. 11 illustrates a block diagram of a distributed system 1100. The distributed system 1100 may distribute portions of the structure and/or operations for the content sharing system 500 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a plurality of server devices 1150. Server devices 1150 may act as messaging servers 110 or third-party content provider servers 420 as described herein. Server devices 1150 may each comprise a processing component 1130 and a communications component 1140. In another example, the server devices 1150 may communicate over a communications media 1112 using communications signals 1114 via the communications components 1140.

Server devices 1150 may each execute a server 1110 or one or more servers providing various services, including, for example, messaging services, webpage hosting services or content providing services. A server 1110 may comprise an element of a content sharing system 500 operative to exchange messages updates on behalf of client devices 1120 or provide content to client devices 1120. Servers 1110 may receive messages from sending client devices, determine recipient client devices for the messages, and forward the messages updates to the recipient client devices. Servers may receive requests for content delivery from a sending client device and may provide content, in accordance with the content sharing system 500 described herein, to receiving client devices.

The client devices 1120 may correspond to any of a smartphone device 150, a tablet device 160, a personal computer device 180, sending client device 310, recipient client device 320, device 1400 or any other client device for a content sharing system 500.

Computing Architecture

Figure 12:
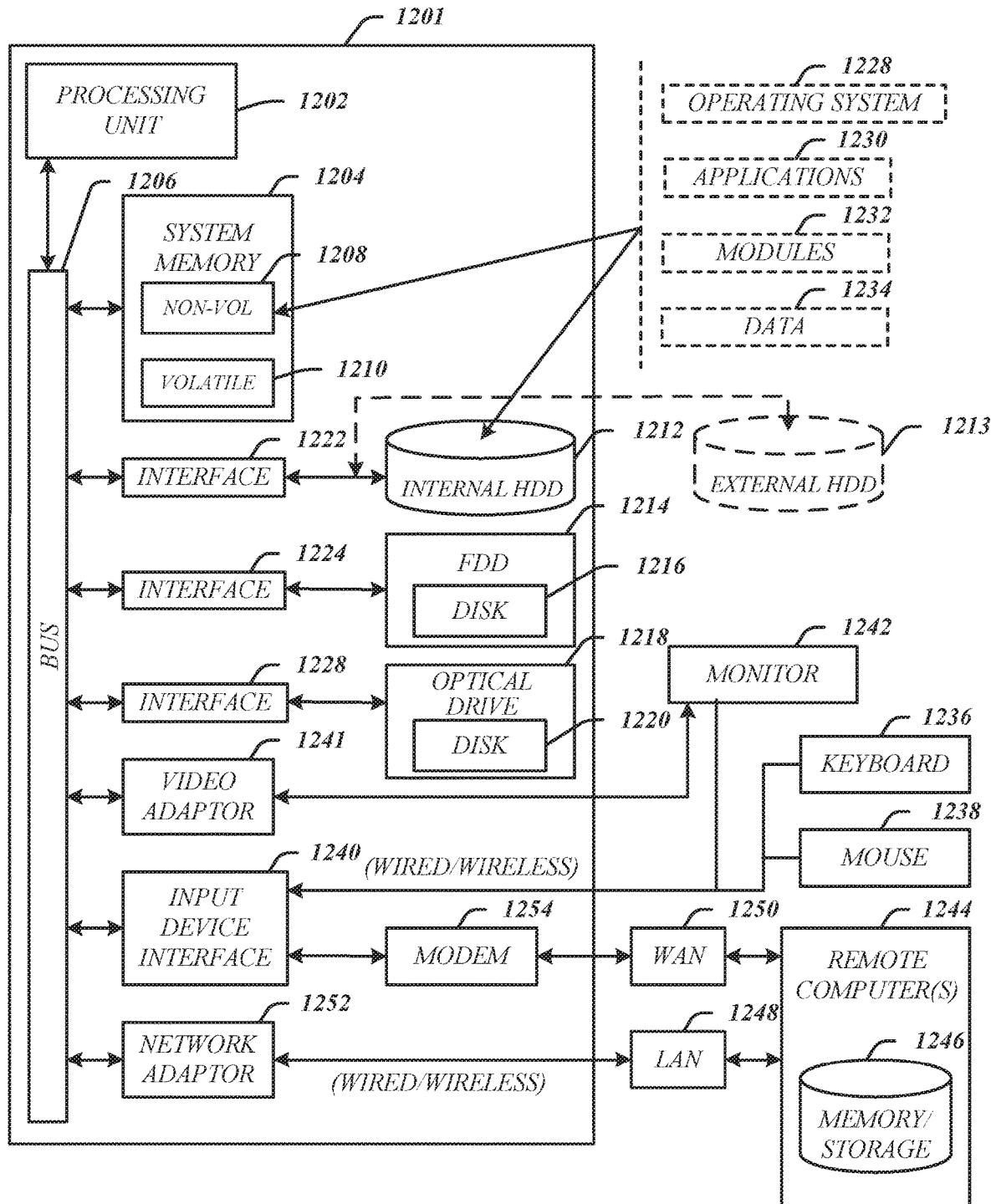
FIG. 12 illustrates an embodiment of an exemplary computing architecture suitable for implementing various embodiments of the invention described herein.

The above-described methods may be embodied as instructions on a computer readable medium or as part of a computing architecture. FIG. 12 illustrates an embodiment of an exemplary computing architecture 1200 suitable for implementing various embodiments as previously described. In one embodiment, the computing architecture 1200 may, in whole or in part, comprise or be implemented as part of an electronic device, such as a computer, smartphone or tablet computing device 1201. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1202, a system memory 1204 and a system bus 1206. The processing unit 1202 can be any of various commercially available processors. Dual microprocessors, multi-core processors, and other multi-processor architectures may also be employed as the processing unit 1202.

The system bus 1206 provides an interface for system components including, but not limited to, the system memory 1204 to the processing unit 1202. The system bus 1206 can be any of several types of bus structure that may further interconnect to a memory bus (with or without a memory controller), a peripheral bus, and a local bus using any of a variety of commercially available bus architectures. Interface adapters may connect to the system bus 1206 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1204 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1204 can include non-volatile memory 1208 and/or volatile memory 1210. A basic input/output system (BIOS) can be stored in the non-volatile memory 1208.

The computing architecture 1200 may include various types of computer-readable storage media in the form of one or more lower speed memory units, including an internal (or external) hard disk drive (HDD) 1212, a magnetic floppy disk drive (FDD) 1214 to read from or write to a removable magnetic disk 1216, and an optical disk drive 1218 to read from or write to a removable optical disk 1220 (e.g., a CD-ROM or DVD). The HDD 1012, FDD 1214 and optical disk drive 1220 can be connected to the system bus 1206 by an HDD interface 1222, an FDD interface 1224 and an optical drive interface 1228, respectively. The HDD interface 1222 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1208, 1212, including an operating system 1228, one or more application programs 1230, other program modules 1232, and program data 1234. In one embodiment, the one or more application programs 1230, other program modules 1232, and program data 1234 can include, for example, the various applications and/or components of the content sharing system 500.

A user can enter commands and information into the computer 1201 through one or more wire/wireless input devices, for example, a keyboard 1236 and a pointing device, such as a mouse 1238. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1202 through an input device interface 1240 that is coupled to the system bus 1206 but can be connected by other interfaces such as a parallel port, IEEE 694 serial port, a game port, a USB port, an IR interface, and so forth.

A monitor 1242 or other type of display device is also connected to the system bus 1206 via an interface, such as a video adaptor 1241. The monitor 1242 may be internal or external to the computer 1201. Monitor 1242 may act as both a display device and as an input device, as in the case of a touch-screen display commonly found on smartphones and tablet computing devices. In addition to the monitor 1242, a computer typically includes other peripheral output devices, such as speakers, printers, and so forth.

The computer 1201 may operate in a networked environment using logical connections via wire and/or wireless communications to one or more remote computers, such as a remote computer 1244. The remote computer 1244 can be a workstation, a server computer, a router, a personal computer, portable computer, microprocessor-based entertainment appliance, a peer device or other common network node, and typically includes many or all of the elements described relative to the computer 1201, although, for purposes of brevity, only a memory/storage device 1246 is illustrated. The logical connections depicted include wire/wireless connectivity to a local area network (LAN) 1248 and/or larger networks, for example, a wide area network (WAN) 1250. Such LAN and WAN networking environments are commonplace in offices and companies, and facilitate enterprise-wide computer networks, such as intranets, all of which may connect to a global communications network, for example, the Internet.

When used in a LAN networking environment, the computer 1201 is connected to the LAN 1248 through a wire and/or wireless communication network interface or adaptor 1252. The adaptor 1252 can facilitate wire and/or wireless communications to the LAN 1248, which may also include a wireless access point disposed thereon for communicating with the wireless functionality of the adaptor 1252.

When used in a WAN networking environment, the computer 1201 can include a modem 1254, or is connected to a communications server on the WAN 1250, or has other means for establishing communications over the WAN 1250, such as by way of the Internet. The modem 1254, which can be internal or external and a wire and/or wireless device, connects to the system bus 1206 via the input device interface 1240. In a networked environment, program modules depicted relative to the computer 1201, or portions thereof, can be stored in the remote memory/storage device 1246. It will be appreciated that the network connections shown are exemplary and other means of establishing a communications link between the computers can be used.

The computer 1201 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi, WiMax, and Bluetooth™ wireless technologies, among others. Thus, the communication can be a predefined structure as with a conventional network or simply an ad hoc communication between at least two devices. Wi-Fi networks use radio technologies called IEEE 802.11x2 (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
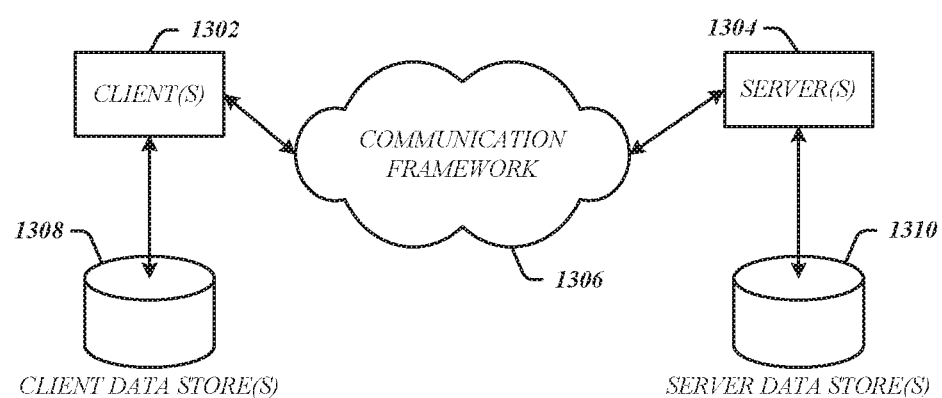
FIG. 13 is a block diagram depicting an exemplary communications architecture suitable for implementing various embodiments of the invention described herein.

FIG. 13 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 13, the communications architecture 1400 includes one or more clients 1302 and servers 1304. Clients 1302 may implement the sending client device 310 and the recipient client device 320. The servers 1304 may implement messaging server device 110. Clients 1302 and the servers 1304 are operatively connected to one or more respective client data stores 1306 and server data stores 1308 that can be employed to store information local to the respective clients 1302 and servers 1304, such as databases, cookies and/or associated contextual information.

Clients 1302 and the servers 1304 may communicate information between each other using a communication framework 1310. The communications framework 1310 may implement any well-known communications techniques and protocols. The communications framework 1310 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1310 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1200 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 14:
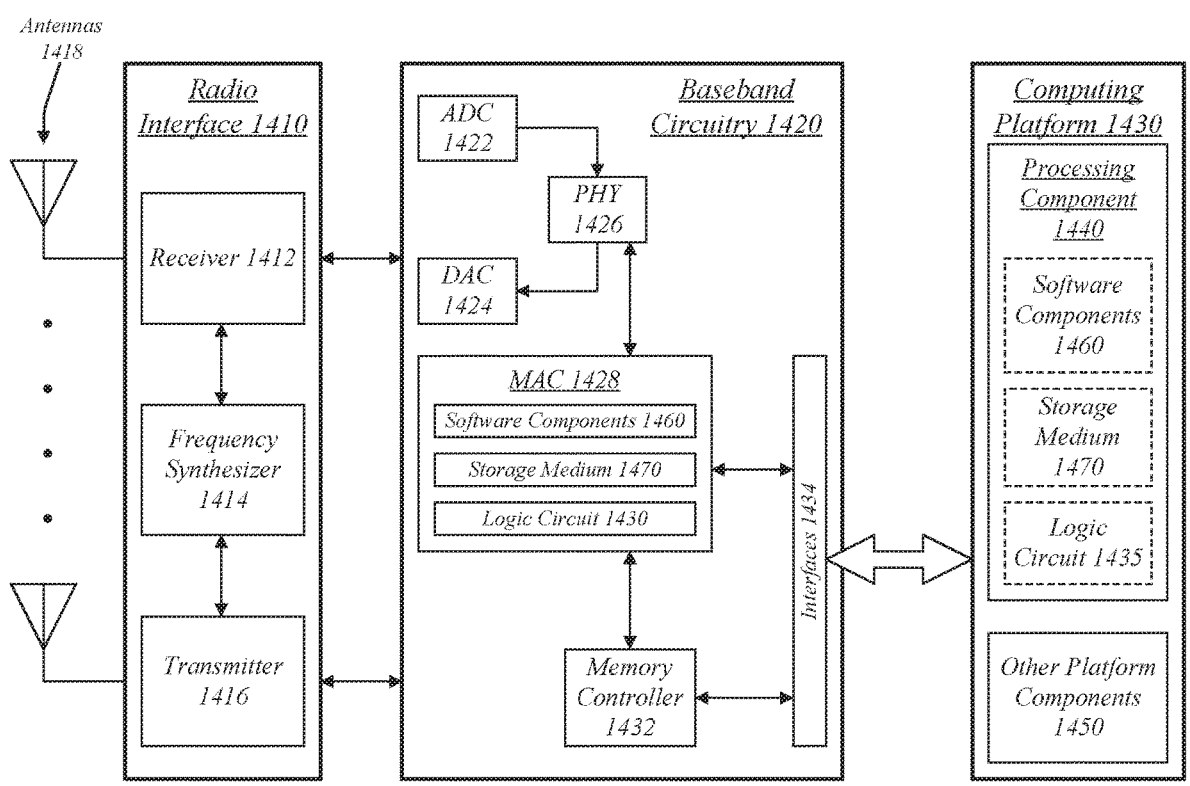
FIG. 14 illustrates an embodiment of a device for use in a multicarrier OFDM system.

FIG. 14 illustrates an embodiment of a device 1400 for use in a multicarrier OFDM system, such as the content sharing system 500 described herein. The device 1400 may implement, for example, software components 1460 as described with reference to the sending client device 310 or the receiving client device 320 may implement messaging client 330 and content provider app 340. The device 1400 may also implement a logic circuit 1435. The logic circuit 1435 may include physical circuits to perform operations described for the content sharing system 500. As shown in FIG. 14, device 1400 may include a radio interface 1410, baseband circuitry 1420, and a computing platform 1430, although embodiments are not limited to this configuration.

The device 1400 may implement some or all of the structure and/or operations for the content sharing system 500 and/or logic circuit 1435 in a single computing entity, such as entirely within a single device. Alternatively, the device 1400 may distribute portions of the structure and/or operations for the content sharing system 500 and/or logic circuit 1404 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1410 may include, for example, a receiver 1412, a transmitter 1416 and/or a frequency synthesizer 1414. The radio interface 1410 may include bias controls, a crystal oscillator and/or one or more antennas 1418. In another embodiment, the radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1420 may communicate with the radio interface 1410 to process receive and/or transmit signals and may include, for example, an analog-to-digital converter 1422 for down converting received signals, and a digital-to-analog converter 1424 for up-converting signals for transmission. Further, the baseband circuitry 1420 may include a baseband or physical layer (PHY) processing circuit 1426 for PHY link layer processing of respective receive/transmit signals. The baseband circuitry 1420 may include, for example, a processing circuit 1428 for medium access control (MAC)/data link layer processing. The baseband circuitry 1420 may include a memory controller 1432 for communicating with the processing circuit 1428 and/or a computing platform 1430, for example, via one or more interfaces 1434.

In some embodiments, the PHY processing circuit 1426 may include a frame construction and/or detection module, in combination with additional circuitry such as a buffer memory, to construct and/or deconstruct communication frames, such as radio frames. Alternatively, or in addition, the MAC processing circuit 1428 may share processing for certain of these functions or perform these processes independent of the PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for the content sharing system 500 and logic circuit 1430 using the processing component 1440. The processing component 1440 (and/or the PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1400 described herein, may be included or omitted in various embodiments of the device 1400, as suitably desired. In some embodiments, the device 1400 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1400 may be implemented using single input single output (SISO) architectures. However, certain implementations may include multiple antennas (e.g., antennas 1418) for transmission and/or reception using adaptive antenna techniques for beamforming or spatial division multiple access (SDMA) and/or using MIMO communication techniques.

The components and features of the device 1400 may be implemented using any combination of discrete circuitry, application specific integrated circuits (ASICs), logic gates and/or single chip architectures. Further, the features of the device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1470 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed:

1. A computer-implemented method comprising:
receiving, in a messaging app on a receiving client device, a message from a sending user in an encrypted E2E messaging session, the message comprising a link to a content item at a third-party content provider and an identifier identifying a private/public key encryption pair on the receiving client device, the public key of the pair having been previously sent to the sending user as part of the E2E messaging session;
displaying the link in the user interface of the messaging app;
receiving a user selection of the link in the user interface of the messaging app;
retrieving, at the receiving client device, the private key of the private key/public key encryption pair identified by the identifier;
generating a digital signature for the link using the private key;
including the digital signature as an argument in the link;
sending the link to the third-party content provider;
receiving the content item from the third-party content provider; and
displaying the content item on the receiving client device.

2. The method of claim 1 wherein the digital signature comprises an encryption of the link using the private key.

3. The method of claim 1;
wherein the digital signature is applied to an iteration count indicating the number of times the content item has been provided by the third-party content provider.

4. The method of claim 1 wherein the content item is displayed in an app on the receiving client device associated with the third-party content provider.

5. The method of claim 1 wherein the content item is displayed in the user interface of the messaging app on the receiving client device.

6. The method of claim 1 wherein the message further comprises a rendering schema and further wherein the link is rendered in the user interface of the messaging app in accordance with the rendering schema.

7. The method of claim 6 wherein the rendering schema identifies a template and further comprises arguments to the template for displaying the link in the user interface of the messaging app.

8. A system comprising:
a processor; and
a memory containing instructions that, when executed, cause the processor to:
receive, in a messaging app on a receiving client device, a message from a sending user in an encrypted E2E messaging session, the message comprising a link to a content item at a third-party content provider and an identifier identifying a private/public key encryption pair on the receiving client device, the public key of the pair having been previously sent to the sending user as part of the E2E messaging session;
display the link in the user interface of the messaging app;
receive a user selection of the link in the user interface of the messaging app;
retrieve, at the receiving client device, the private key of the private key/public key encryption pair identified by the identifier;
generate a digital signature for the link using the private key;
include the digital signature as an argument in the link;
send the link and the digital signature to the third-party content provider;
receive the content item from the third-party content provider; and
display the content item on the receiving client device.

9. The system of claim 8 wherein the digital signature comprises an encryption of the link using the private key.

10. The system of claim 8
wherein the digital signature is applied to an iteration count indicating the number of times the content item has been provided by the third-party content provider.

11. The system of claim 8 wherein the content item is displayed in an app on the receiving client device associated with the third-party content provider.

12. The system of claim 8 wherein the content item is displayed in the user interface of the messaging app on the receiving client device.

13. The system of claim 8 wherein the message further comprises a rendering schema and further wherein the link is rendered in the user interface of the messaging app in accordance with the rendering schema.

14. The system of claim 13 wherein the rendering schema identifies a template and further comprises arguments to the template for displaying the link in the user interface of the messaging app.

15. A non-transitory computer-readable storage medium containing instructions that, when executed by processor, cause the processor to:
receive, in a messaging app on a receiving client device, a message from a sending user in an encrypted E2E messaging session, the message comprising a link to a content item at a third-party content provider and an identifier identifying a private/public key encryption pair on the receiving client device, the public key of the pair having been previously sent to the sending user as part of the E2E messaging session;
display the link in the user interface of the messaging app;
receive a user selection of the link in the user interface of the messaging app;
retrieve, at the receiving client device, the private key of the private key/public key encryption pair identified by the identifier;
generate a digital signature for the link using the private key;
include the digital signature as an argument in the link;
send the link to the third-party content provider;
receive the content item from the third-party content provider; and
display the content item on the receiving client device.

16. The medium of claim 15 wherein the digital signature comprises an encryption of the link using the private key.

17. The medium of claim 15 wherein the digital signature is applied to an iteration count indicating the number of times the content item has been provided by the third-party content provider.

18. The medium of claim 15 wherein the content item is displayed in an app on the receiving client device associated with the third-party content provider.

19. The medium of claim 15 wherein the content item is displayed in the user interface of the messaging app on the receiving client device.

20. The medium of claim 15 wherein:
the message further comprises a rendering schema;
the link is rendered in the user interface of the messaging app in accordance with the rendering schema; and
the rendering schema identifies a template and further comprises arguments to the template for displaying the link in the user interface of the messaging app.

\* \* \* \* \*